United States Patent
Pyszczek

(10) Patent No.: US 8,974,119 B2
(45) Date of Patent: Mar. 10, 2015

(54) ASYMMETRIC SPLIT BEARING WITH GEOMETRICALLY CONTOURED WORK SURFACE

(71) Applicant: Michael F. Pyszczek, Leroy, NY (US)

(72) Inventor: Michael F. Pyszczek, Leroy, NY (US)

(73) Assignee: Genesee Northern Research LLC, West Henrietta, NY (US)

( * ) Notice: Subject to any disclaimer, the term of this patent is extended or adjusted under 35 U.S.C. 154(b) by 0 days.

(21) Appl. No.: 14/149,455

(22) Filed: Jan. 7, 2014

(65) Prior Publication Data

US 2014/0193106 A1   Jul. 10, 2014

Related U.S. Application Data

(60) Provisional application No. 61/750,075, filed on Jan. 8, 2013.

(51) Int. Cl.
| | | |
|---|---|---|
| *F16C 9/02* | (2006.01) | |
| *F16C 33/10* | (2006.01) | |
| *F16C 33/04* | (2006.01) | |
| *F16C 9/04* | (2006.01) | |
| *F16C 17/04* | (2006.01) | |
| *F16C 17/10* | (2006.01) | |
| *F16C 17/26* | (2006.01) | |
| *F16C 33/12* | (2006.01) | |
| *F16C 17/24* | (2006.01) | |
| *F16C 33/20* | (2006.01) | |
| *F16C 33/24* | (2006.01) | |

(52) U.S. Cl.
CPC ............. *F16C 33/046* (2013.01); *F16C 9/04* (2013.01); *F16C 17/04* (2013.01); *F16C 17/107* (2013.01); *F16C 17/26* (2013.01); *F16C 33/128* (2013.01); *F16C 2240/48* (2013.01); *F16C 17/246* (2013.01); *F16C 33/043* (2013.01); *F16C 33/20* (2013.01); *F16C 33/24* (2013.01)
USPC .......................................... 384/291; 384/294

(58) Field of Classification Search
CPC ........... F16C 9/02; F16C 9/04; F16C 33/1065
USPC ........................... 384/286, 288, 291, 293, 294
See application file for complete search history.

(56) References Cited

U.S. PATENT DOCUMENTS

| 6,481,895 B2 * | 11/2002 | Yang et al. ................. 384/294 |
| 8,105,172 B2 | 1/2012 | Maciag |
| 2003/0068106 A1 * | 4/2003 | Greene et al. .............. 384/279 |

FOREIGN PATENT DOCUMENTS

| EP | 74676 A1 * | 3/1983 |
| EP | 0074676 B1 | 3/1985 |
| GB | 927890 A * | 3/1962 |

* cited by examiner

*Primary Examiner* — Phillip A Johnson
(74) *Attorney, Agent, or Firm* — Harris Beach PLLC

(57) ABSTRACT

An asymmetric split bearing with a geometrically contoured work surface is provided that has an upper segment and lower segment and a plurality of spaced, recesses in the sidewall of the bearing segment, which are joined together by means of bearing surfaces or lands. The asymmetric split bearing allows for a greater range of applications, such as reciprocating engine crankshafts, which require split bearings for support. The number of bearing surfaces on each segment can be optimized for load conditions and to minimize friction. The bearing utilizes powdered metal manufacturing and is self-cleaning.

10 Claims, 2 Drawing Sheets

ASYMMETRIC SPLIT BEARING WITH GEOMETRICALLY CONTOURED WORK SURFACE

CROSS-REFERENCE TO RELATED APPLICATIONS

This application claims priority to and the benefit of U.S. provisional patent application Ser. No. 61/750,075, entitled Asymmetric Split Bearing With Geometrically Contoured Work Surface, filed Jan. 8, 2013, which is incorporated herein by reference in its entirety.

TECHNICAL FIELD

The present invention relates to split bearings for reciprocating engine crankshafts and, more particularly, to a bearing assembly having a debris removal system that improves the performance and/or life of the bearing assembly by removing debris, i.e., wear particles generating during normal bearing operation.

BACKGROUND OF THE INVENTION

A bearing is a machine element that constrains relative motion and reduces friction between moving parts to only the desired motion. A common class of bearings is roller bearings, which utilize balls or rolling elements to reduce friction. Another class of bearings operates without rolling members and is commonly referred to as plain or sliding bearings. Typically, these latter types of bearings rely on sliding movement (as opposed to rolling movement) and either an oil or a non-solid grease to lubricate or facilitate relative movement. One type of non-roller bearing uses oil which is continuously delivered to the surfaces of the bearing by a groove in one of the bearing surfaces. This type of bearing must operate at very high speeds (circa 10,000 rpm) so that the oil can create a hydrostatic film with sufficient force to prevent the load transfer surface and the bearing surfaces from making direct and often metal-to-metal contact. Direct contact leads to friction causing excessive heat and wear, as well as eventual seizure. Fully rotational, constant high speed is required to maintain the film. There is no mechanism for removing wear debris after it is generated in these types of bearings. Another type of non-roller prior art bearing relies on various viscosity greases to separate bearing surfaces from load transfer surfaces. The grease is applied to one of the bearing and load transfer surfaces. It has been established by bearing design tribologists that the maximum practical limit of PV (psi-sfm) of this type of bearing is approximately 50,000. PV is a measure of the performance capability of a sliding bearing.

P is a measure of pressure on the bearing's surface in pounds per square inch (psi), while V is a measure of the velocity of the bearing's surface in surface feet per minute (sfm). The product of the two, PV, is an indication of the performance capability of the bearing. The PV rating is sensitive to the composition of the materials of the contacting surfaces. Materials chosen for speed (high sfm), V, sacrifice their ability to support load capacity, P. Polymer materials (Polycarbonates, Acetyls, Nylon) whose PVs approximate 3,000, with a maximum P of 1,000 psi, fall into this class. Metals permit higher load carrying with PVs ranging from 20,000 to 50,000. Those with low coefficients of friction (i.e., higher lubricity) which include carbon graphite, bronze, tin-bronze, aluminum-bronze, are still limited by the maximum speed permitted, typically under 300 sfm. Conventional bearings fabricated with powdered metals typically operate in the 15,000 to 50,000 PV range. The best performance has been received by PM bearings referred to as porous iron and porous bronze, whose maximum PVs are 30,000 and 50,000, respectively. Generally, prior art bearings were not designed for removing debris between bearing surfaces and the load transfer surface. Rather, prior art bearings focused on the delivery of liquid lubricants to prevent surfaces from rubbing and generating wear particles.

Geometrically contoured bearings having improved load bearing capabilities and low maintenance attributes have been described in U.S. Pat. No. 8,105,172. The applications based on these teachings, however, are limited to one-piece bearings capable of being positioned on a shaft such as a universal joint cross.

Citation or identification of any reference in Section 2, or in any other section of this application, shall not be considered an admission that such reference is available as prior art to the present invention.

SUMMARY OF THE INVENTION

An asymmetric split bearing comprising a geometrically contoured work surface is provided. In one embodiment, the bearing comprises:

an upper bearing segment comprising an upper bearing segment sidewall;

a lower bearing segment comprising a lower bearing segment sidewall; and a plurality of spaced recesses in the upper bearing segment sidewall and in the lower bearing segment sidewall, wherein the recesses are joined together by bearing surfaces.

In one embodiment of the bearing, the bearing surfaces comprise segments of a cylindrical surface.

In another embodiment of the bearing, a plurality of the segments is joined such that the outside surface of the bearing is essentially cylindrical.

In another embodiment of the bearing, the upper bearing segment and/or the lower bearing segment are manufactured from powdered metal, polymer, ceramic or wrought metal.

In another embodiment of the bearing, the number of bearing surfaces and recesses in the upper bearing segment are greater than the number of bearing surfaces and recesses in the lower bearing segment.

In another embodiment of the bearing, the number of bearing surfaces and recesses in the upper bearing segment are lower than the number of bearing surfaces and recesses in the lower bearing segment.

In another embodiment of the bearing, the number of bearing surfaces and recesses in the upper bearing segment are the same as the number of bearing surfaces and recesses in the lower bearing segment.

BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated, enlarged, exploded, or incomplete to facilitate an understanding of the invention.

DETAILED DESCRIPTION OF THE INVENTION

Figure 1:
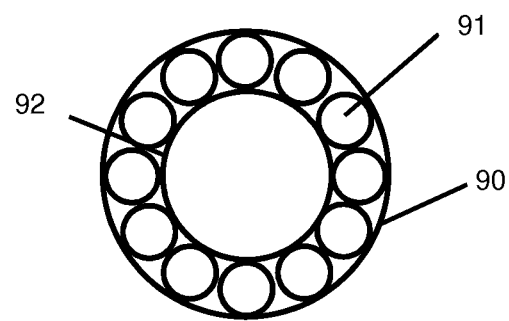
FIG. 1 shows a typical prior art ball bearing. A plurality of balls or rollers 91 is placed between an outer cylindrical component 90 and an inner cylindrical component 92. This bearing requires access to the end of the rotating shaft to allow placement of the bearing.

A new and improved bearing assembly is provided that overcomes the foregoing difficulties and others and provides the aforementioned and other advantageous features. More particularly, in accordance with one aspect of the present invention, the bearing assembly includes a rotatable shaft defining a load transfer surface. A porous bearing surrounds and is movable relative to the shaft. The bearing includes bearing surfaces extending radially toward the shaft.

An improved bearing assembly is also provided that reduces and/or eliminates the amount and size of deleterious debris or wear particles generated during normal use of the bearing assembly, removes any generated debris from between the bearing surfaces and the load transfer surface, has an increased useful performance life, has increased performance capabilities, and has decreased costs related to the manufacture and maintenance of the bearing assembly.

An asymmetric split bearing with a geometrically contoured work surface (also referred to herein as an "asymmetric geometrically contoured split bearing" or an "asymmetric split bearing) is also provided. The asymmetric split bearing allows for a greater range of applications, such as reciprocating engine crankshafts, which currently require split bearings for support.

The bearing is preferably fabricated using powder materials techniques and powdered materials which advantageously form the integral bearing surfaces and shapes within the bearing, thereby eliminating the necessity for the use of balls, needles or other rolling members with the bearing. Moreover, using powder materials techniques and powdered materials, the bearing is at least partially porous and can be impregnated with a base oil or other lubricating material, and can be further used to transfer supplemental lubricant to the bearing surface. In one embodiment of the bearing, the upper bearing segment and/or the lower bearing segment are manufactured from powdered metal, polymer, ceramic or wrought metal.

In a further aspect, the bearing can be formed in one or more segments that are joined such that the outside surface of the bearing is essentially cylindrical. Each of the segments may have a plurality of spaced recesses in the sidewall of each segment, wherein the recesses are joined together by bearing surfaces or lands.

Due to the strength requirements of reciprocating engine crankshafts, a single, forged component is required. The locations of the inner supports and connecting rod journals prevent the use of solid-ring type bearings such as a common ball or roller bearings. Instead, crankshaft supports utilize solid bushings, which typically impart higher friction and wear upon the shaft. The asymmetric split bearing with a geometrically contoured surface can be employed to reduce friction and remove debris, enabling longer shaft life and improved overall engine efficiency. Friction reduction is achieved by the reduction of surface contact area between the load transfer surface and bearing surface. The reduced contact area is a provided by the geometrically contoured bearing surface. Further friction reduction is realized by the powdered metal's ability to deliver lubricant directly to the bearing surface.

The load placed on a bearing surface in a reciprocating engine (i.e., an internal combustion engine) varies based on the cycle of engine. The bearing surrounding the crankshaft journal experiences different loads based on its orientation to the connecting rod. For example, the segment of the bearing in direct alignment with the rod will see a high impulse load during the power stroke of the engine. The segment of the bearing on the opposite side of the journal experiences comparatively lighter loads during the compression and exhaust cycles.

The asymmetric split bearing disclosed herein is a geometrically contoured bearing in an asymmetric configuration that can accommodate a higher load-carrying capability in one segment of the bearing, while allowing the lower load segment to be configured for lower friction. This is accomplished through the geometric design and number of bearing surfaces in contact with the shaft as taught in U.S. Pat. No. 8,105,172. Other design considerations associated with the geometrically contoured bearing concept, such as the width of the lands, composition of the powdered metal, or lubricant properties, may also be manipulated, using methods also described in U.S. Pat. No. 8,105,172 to produce an optimal configuration.

For example, the segment of the bearing which is subjected to higher loads can be designed with wider lands to reduce the pressure on the bearing surface (psi) while the segment of the same bearing which is subjected to a lighter load can be narrower lands to reduce surface contact area.

To assemble the asymmetric, geometrically contoured split bearing, the bearing segments are equipped with a feature that mates with the desired side of the journal support or connecting rod. This "key" is configured in such a fashion to prevent the inadvertent placement of the high load bearing segment of the bearing in the incorrect position on the journal. Various mechanical appliances such as a "tab and slot" would be suitable for this purpose.

Another application of the asymmetric geometrically contoured split bearing is in devices where maintenance of the current bearing requires a continuous ring type bearing to be removed from the end of a shaft. In such cases a low friction split bearing would greatly reduce maintenance expenses and down time of the device. Such applications include stationary generators and turbines driven by wind, water, or other form of power.

FIG. 1 shows a typical prior art ball bearing. A plurality of balls or rollers 91 is placed between an outer cylindrical component 90 and an inner cylindrical component 92. This bearing requires access to the end of the rotating shaft to allow placement of the bearing.

The following embodiments are offered by way of illustration and not by way of limitation.

Figure 2A:
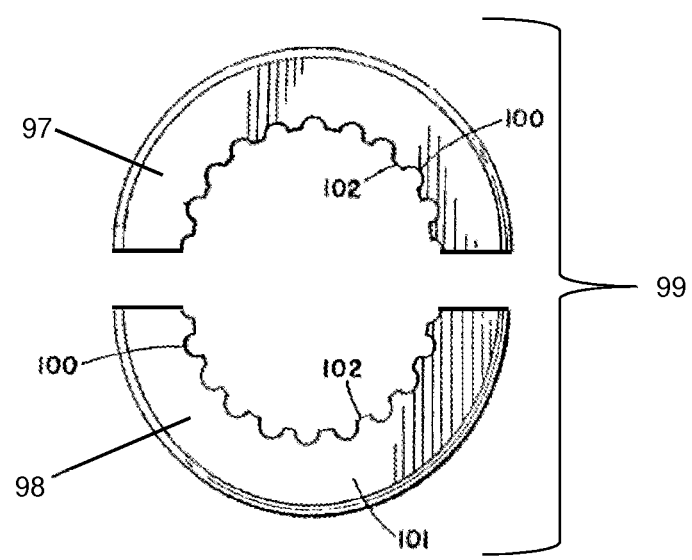
FIG. 2A shows one embodiment of the asymmetric split bearing 99 disclosed herein. The asymmetric split bearing 99 comprises an upper segment 97 and lower segment 98. The bearing 99 is provided with a plurality of spaced recesses 100 in the sidewall 101 of the bearing segment, wherein the members of the plurality of spaced recesses are joined together by means of bearing surfaces 102. According to this embodiment, the bearing surfaces 102 are defined as segments of a cylindrical surface. In the practice of the asymmetric geometrically contoured split bearing 99, the bearing surfaces 102 and recesses 100 comprising the upper segment 97 and lower segment 98 may be dissimilar based on a design optimized for the load requirements of that segment.

FIG. 2A shows one embodiment of the asymmetric split bearing 99 disclosed herein. The asymmetric split bearing 99 comprises an upper segment 97 and lower segment 98. The bearing 99 is provided with a plurality of spaced, essentially semi-circular recesses 100 in the sidewall 101 of the bearing segment, wherein the members of the plurality of spaced, essentially semi-circular recesses are joined together by means of bearing surfaces 102. According to this embodiment, the bearing surfaces 102 are defined as segments of a cylindrical surface. In the practice of the asymmetric geometrically contoured split bearing 99, the bearing surfaces 102 and recesses 100 comprising the upper segment 97 and lower segment 98 may be dissimilar based on a design optimized for the load requirements of that segment.

Figure 2B:
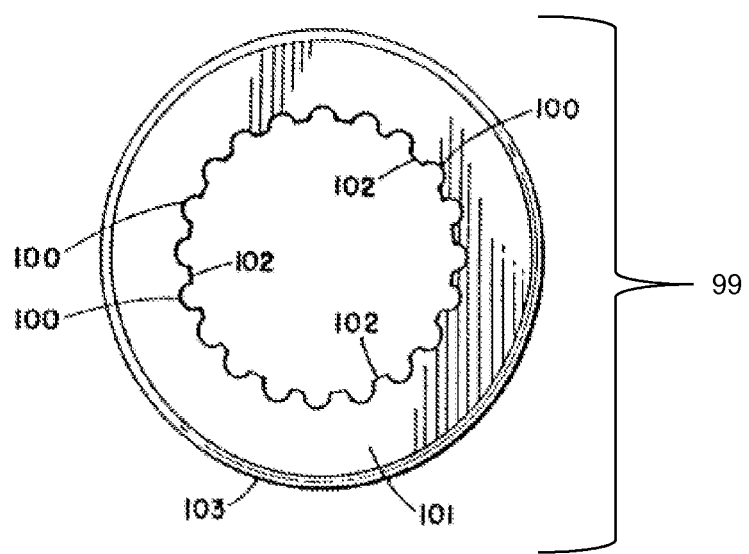
FIG. 2B shows another embodiment of the asymmetric split bearing 99 disclosed herein. When the two segments of the split bearing 99 are joined as shown in FIG. 2B, the outside surface of bearing 99 is essentially cylindrical 103 as shown.

FIG. 2B shows another embodiment of the asymmetric split bearing 99 disclosed herein. When the two segments of the split bearing 99 are joined as shown in FIG. 2B, the outside surface of bearing 99 is essentially cylindrical 103 as shown.

Figure 3:
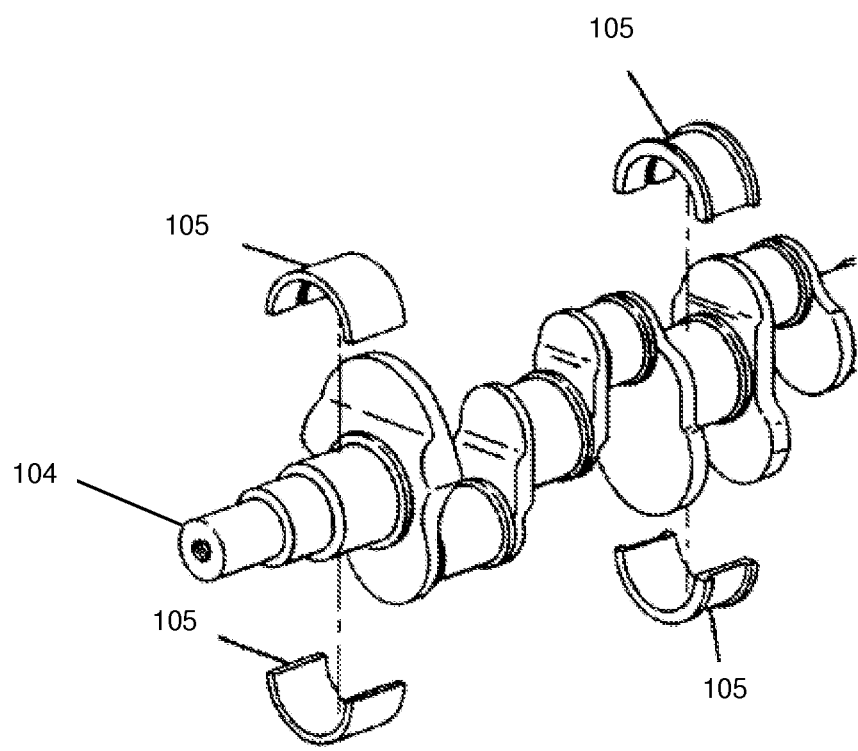
FIG. 3 shows a view of a typical reciprocating engine crankshaft 104 along with the locations requiring split bearing devices 105.

FIG. 3 shows a view of a typical reciprocating engine crankshaft 105 along with the locations requiring split bearing devices 105.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

While embodiments of the present disclosure have been particularly shown and described with reference to certain examples and features, it will be understood by one skilled in the art that various changes in detail may be effected therein without departing from the spirit and scope of the present disclosure as defined by claims that can be supported by the written description and drawings. Further, where exemplary embodiments are described with reference to a certain number of elements it will be understood that the exemplary embodiments can be practiced utilizing either less than or more than the certain number of elements.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

The citation of any publication is for its disclosure prior to the filing date and should not be construed as an admission that the present invention is not entitled to antedate such publication by virtue of prior invention.

What is claimed is:

1. An asymmetric split bearing comprising a geometrically contoured work surface, the bearing comprising:
   an upper bearing segment comprising an upper bearing segment sidewall;
   a lower bearing segment comprising a lower bearing segment sidewall; and a plurality of axially oriented spaced recesses in the upper bearing segment sidewall and in the lower bearing segment sidewall, wherein the axially oriented spaced recesses are joined together by a plurality of bearing surfaces.

2. The bearing of claim 1 wherein the bearing surfaces comprise segments of a cylindrical surface.

3. The bearing of claim 1 wherein the upper bearing segment and the lower bearing segment are joined such that the outside surface of the bearing is essentially cylindrical.

4. The bearing of claim 1 wherein the upper bearing segment and/or the lower bearing segment are manufactured from powdered metal, polymer, ceramic or wrought metal.

5. The bearing of claim 1 wherein the number of bearing surfaces and recesses in the upper bearing segment are greater than the number of bearing surfaces and recesses in the lower bearing segment.

6. The bearing of claim 1 wherein the number of bearing surfaces and recesses in the upper bearing segment are lower than the number of bearing surfaces and recesses in the lower bearing segment.

7. The bearing of claim 1 wherein the number of bearing surfaces and recesses in the upper bearing segment are the same as the number of bearing surfaces and recesses in the lower bearing segment.

8. The bearing of claim 1 comprising a plurality of upper bearing segments and a plurality of lower bearing segments, wherein the plurality of upper bearing segments and/or the plurality of lower bearing segments are joined such that the outside surface of the bearing is essentially cylindrical.

9. The bearing of claim 1 wherein the upper bearing segment and/or the lower bearing segment are manufactured from powdered metal, thereby functioning to reduce and/or eliminate the amount and size of debris or wear particles generated during use.

10. The bearing of claim 1 wherein the upper bearing segment and the lower bearing segment are constructed with lands and recesses that can accommodate a higher load-carrying capability in one segment of the bearing, and wherein the lands and recesses in the opposing segment are configured for lower friction.

* * * * *